United States Patent
Tronquoy et al.

(10) Patent No.: US 11,035,434 B2
(45) Date of Patent: Jun. 15, 2021

(54) BEARING ASSEMBLY EQUIPPED WITH A ROLLING BEARING AND SCISSORS GEAR, IN PARTICULAR FOR A BALANCING SHAFT

(71) Applicant: Aktiebolaget SKF, Gothenburg (SE)

(72) Inventors: Nicolas Tronquoy, Fondettes (FR); Bruno Montboeuf, Saint-Cyr-sur-Loire (FR); Philippe Walter, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 427 days.

(21) Appl. No.: 16/106,158

(22) Filed: Aug. 21, 2018

(65) Prior Publication Data

US 2019/0101182 A1    Apr. 4, 2019

(30) Foreign Application Priority Data

Sep. 29, 2017   (DE) .......................... 102017217397.1

(51) Int. Cl.
| | |
|---|---|
| *F16F 15/26* | (2006.01) |
| *F16H 55/18* | (2006.01) |
| *F16C 19/08* | (2006.01) |
| *F16C 35/063* | (2006.01) |

(52) U.S. Cl.
CPC ........... *F16F 15/267* (2013.01); *F16H 55/18* (2013.01); *F16C 19/08* (2013.01); *F16C 35/063* (2013.01); *F16C 2326/01* (2013.01); *F16C 2361/61* (2013.01)

(58) Field of Classification Search
CPC .... F16H 55/18; F16H 57/0031; F16F 15/267; F16C 19/08; F16C 2326/01; F16C 2361/61; F16C 35/063; F16C 33/581; Y10T 74/19898; Y10T 74/19623
See application file for complete search history.

(56) References Cited

U.S. PATENT DOCUMENTS

| | | | | |
|---|---|---|---|---|
| 8,245,591 | B2 * | 8/2012 | Chen ....................... | F16H 55/18 |
| | | | | 74/409 |
| 9,297,451 | B2 * | 3/2016 | Buchleitner .............. | B22F 5/08 |
| 10,197,153 | B2 * | 2/2019 | Dumanski ............... | F16H 55/18 |
| 10,584,766 | B2 * | 3/2020 | Tronquoy ............. | F16F 15/267 |
| 2014/0224053 | A1 * | 8/2014 | Buchleitner ........... | F16H 55/17 |
| | | | | 74/445 |
| 2017/0307078 | A1 * | 10/2017 | Leimann ............. | F16H 57/0025 |

FOREIGN PATENT DOCUMENTS

| | | | | | |
|---|---|---|---|---|---|
| DE | 102013219299 | A1 * | 3/2015 | ......... | F16H 57/0031 |
| EP | 2161478 | A1 * | 3/2010 | ............. | F16H 55/18 |
| WO | WO-2013024676 | A1 * | 2/2013 | ......... | F16H 57/0479 |

\* cited by examiner

*Primary Examiner* — Daniel D Yabut
(74) *Attorney, Agent, or Firm* — Garcia-Zamor Intellectual Property Law; Ruy Garcia-Zamor; Bryan Peckjian

(57) ABSTRACT

A bearing assembly comprising a rotating shaft, a rolling bearing and a scissors gear. The bearing assembly further comprises an axial retaining arrangement for the scissors gear onto the rolling bearing. A lock washer is arranged in a groove of an outer massive ring of the rolling bearing.

19 Claims, 2 Drawing Sheets

BEARING ASSEMBLY EQUIPPED WITH A ROLLING BEARING AND SCISSORS GEAR, IN PARTICULAR FOR A BALANCING SHAFT

CROSS-REFERENCE

This application claims priority to German patent application no. 102017217397.1 filed on Sep. 29, 2017, the contents of which are fully incorporated herein by reference.

TECHNOLOGICAL FIELD

The present invention relates to a bearing assembly comprising a rolling bearing and scissors gear. The bearing assembly is particularly suitable for use with a balancing shaft dedicated to be used in a motor vehicle.

BACKGROUND

Internal combustion engines are often equipped with balancing shafts systems adapted to compensate varying loads on crankshafts. As balancing shafts have eccentric balancing masses which generate heavy loads, the rotation of balancing shafts is allowed by rolling bearings mounted in supports of the internal combustion engine.

A balancing shaft can be driven by a gear. It is particularly well known to provide a scissors gear to balancing shaft so as to prevent backlash between driving and following gears due to rotational speed variations.

The scissors gear generally comprises a main gear, an auxiliary gear, and a scissors spring housed in a cavity defined between the main and auxiliary gears, so as to lessen the amount of backlash.

Scissors gear is supported by a rolling bearing, the main gear being press-fitted onto an outer cylindrical surface of an outer massive ring of the rolling bearing while the auxiliary gear is mounted with a loose-fit onto the cylindrical surface. An inner ring of the rolling bearing is mounted onto a portion of the balancing shaft.

Basically, the outer ring comprises an axial blocking flange to maintain axially the auxiliary gear. However, a massive ring provided with such cylindrical surface and flange means a grinding process on the outer ring diameter to optimize the mounting process. Moreover, such massive ring is relatively expensive.

BRIEF SUMMARY OF THE PRESENT INVENTION

It is desirable to provide a massive outer ring to rolling bearing that is easy to manufacture, of reduced material and manufacturing costs, and suitable to support a scissors gear.

To this end, the invention relates to a bearing assembly comprising a rotating shaft and a rolling bearing having an inner ring mounted on the rotating shaft, an outer massive ring, and at least one row of rolling elements radially housed between the inner and outer rings. The bearing assembly further comprises a scissors gear having a main gear press fitted onto an outer cylindrical surface of the outer massive ring, an auxiliary gear mounted with loose fit onto the outer cylindrical surface, and a scissors spring arranged between the main and auxiliary gears. An axial retaining arrangement is further provided between the outer ring of rolling bearing and scissors gear, the auxiliary gear being axially blocked between the axial retaining arrangement and main gear.

According to the invention, the axial retaining arrangement consists in the combination of an annular radial groove provided to the outer massive ring and a lock washer mounted in the groove. The annular radial groove is disposed at one axial end of the outer cylindrical surface and axially opposite to the main gear, and is circumferentially radially open to the outer cylindrical surface. The lock washer is annular, and comprises a radial outer portion and a substantially conical inner portion with a plurality of tongues inwardly extending from the radial outer portion. The substantially conical inner portion of lock washer is mounted in the annular groove, the radial outer portion radially extending beyond the groove so as to form an axial stop for the auxiliary gear.

Thanks to this invention, the annular groove is easy to manufacture on a grinded outer cylindrical surface of the outer massive ring. A process including a centerless grinding step can be achieved which is cost effective. Moreover, only a limited amount of material is removed to manufacture the groove. It reduces the manufacturing and material costs of ring.

The lock washer is provided with an elastically deformable inner portion, with a plurality of tongues. Moreover, this portion is of substantial conical shape. Then the inner portion of lock washer is easily axially mountable within the annular groove.

The conical shape of the inner portion are suitable to be axially blocked between edges defined by the annular groove. Moreover, the tongues with sharp lower edge can grip with the bottom of the annular groove so as to prevent any axial displacement. The lock washer is then securely fixed with the outer ring.

The outer portion of lock washer is annular and extends radially beyond the edges of annular groove so as to cooperate with the auxiliary gear of scissors gear. Then the gear body mounted with loose fit onto the outer ring is axially maintained.

According to further aspects of the invention which are advantageous but not compulsory, such a manufacturing method of a bearing ring may incorporate one or several of the following features:

The rolling elements are balls.

Two axially adjacent rows of rolling elements are radially arranged between the inner and outer rings of rolling bearing.

The rolling elements are circumferentially maintained by a cage.

The annular groove is a rabbet open axially on a front surface and radially on the outer cylindrical surface of the outer massive ring, and comprises a radial portion extending in the rabbet which is in abutment against an inner end of the substantially conical portion of lock washer, the radial portion being formed by plastic deformation of the front surface.

The radial portion comprises an outer sloped surface so as to ease the insertion of the substantial conical inner portion of lock washer in the rabbet.

The rotating shaft is a balancing shaft.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF THE PRESENT INVENTION

Figure 1:
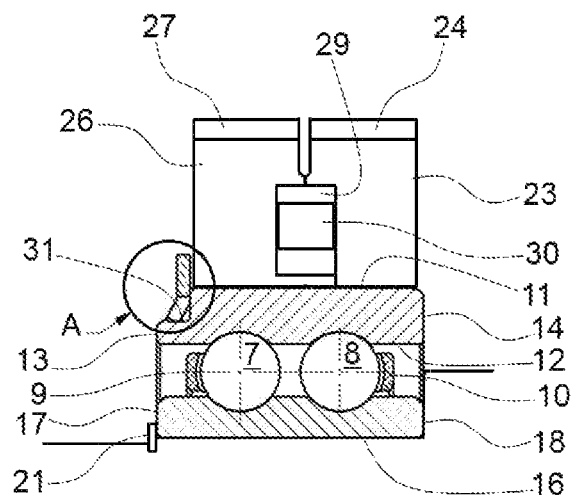
FIG. 1 presents a sectional view of a bearing assembly according to the present invention.
Figure 1:
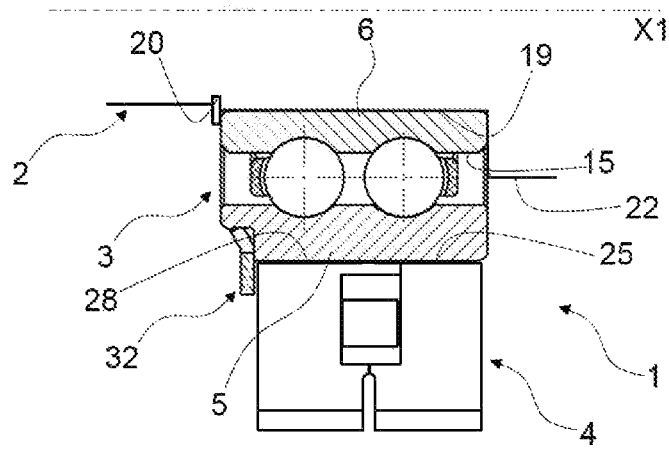
Figure 2:
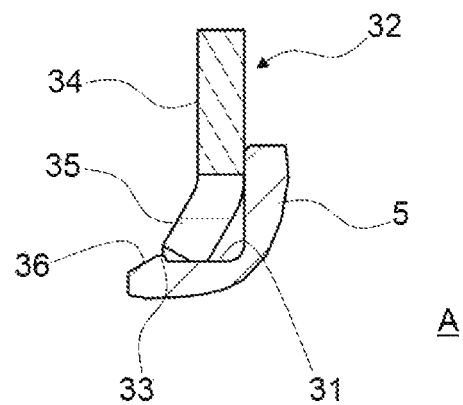
FIG. 2 presents a sectional view, at a larger scale, showing detail A of FIG. 1.
Figure 3:
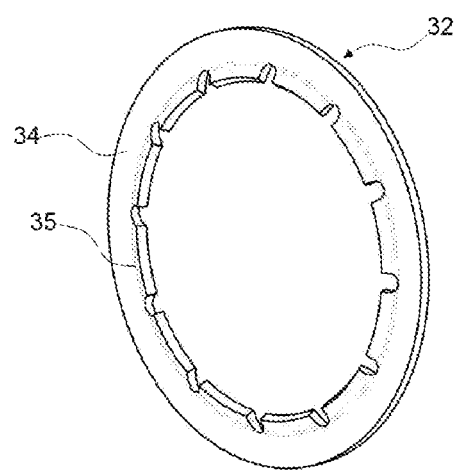
FIG. 3 presents a perspective view of a lock washer according to the present invention.

A bearing assembly 1 is represented on FIG. 1, in particular for use with a balancing shaft in a piston engine of a motor vehicle, the shaft being an eccentric weighted shaft that offsets vibrations in the engine.

The assembly 1 comprises a stepped rotating shaft 2, here a balancing shaft, a rolling bearing 3, here a double row ball bearing, and a scissors gear 4. Shaft 2, bearing 3 and scissors gear 4 are centered on a common longitudinal axis X1.

Hereinafter, to facilitate the special identification of the assembly 1 for this figure and for the following ones, the adjectives "radial" and "axial" and the adverbs "radially" and "axially" are defined relative to the axis X1. Thus, an axial portion or part is parallel to the axis X1, whilst a radial portion or part is perpendicular to the axis X1.

Bearing 3 with central axis X1 comprises an outer ring 5, an inner ring 6, two rows of rolling elements 7 and 8, here balls, arranged in parallel planes held by cages 9 and 10, respectively. The rings 5, 6 are coaxial with the central axis X1 in the normal operating mode.

The outer ring 5 comprises an outer cylindrical surface 11, a bore 12 wherein two concave raceways are formed for the balls 7, 8, and two front surfaces 13, 14.

The inner ring 6 comprises an outer cylindrical surface 15 wherein are formed two concave raceway for the balls 7, 8, a bore 16, and two front surfaces 17, 18.

The rings 5, 6 are massive. A "massive ring" is to be understood as a ring obtained by machining with removal of material, in particular by grinding, from metal tube stock, rough forging and/or rolled blanks.

Alternatively, the rolling bearing 3 may comprise other types of rolling elements than balls, for example rollers or needles. Alternatively, the rolling bearing 3 may comprise only one row of rolling elements.

Rotating shaft 2 with central axis X1 is stepped. Shaft 2 comprises an outer cylindrical surface 19 on which the bore 16 of inner ring 6 of bearing 3 is press fitted. The surface 19 is axially defined between a groove 20 wherein a ring 21 is provided so as to axially block the inner ring 6 in a first axial direction, and a shoulder 22 so as to axially block the inner ring 6 in a second axial direction. Rolling bearing 3 is then securely fixed to rotating shaft 2.

Scissors gear 4 is arranged radially opposite to rotating shaft 2 with respect to rolling bearing 3. Scissors gear is mounted on outer cylindrical surface 11 of outer ring 5 of rolling bearing 3.

Scissors gear 4 comprises a main gear 23 provided with outer teeth 24 and an inner bore 25 press fitted on the outer cylindrical surface 11 of outer ring 5. Scissors gear 4 also comprises an auxiliary gear 26 provided with outer teeth 27 and an inner bore 28 mounted with loose fit onto the outer cylindrical surface 11 of outer ring 5, the auxiliary gear 26 being axially adjacent to main gear 23. A cavity 29 is defined between the main and auxiliary gears 23, 26, wherein a scissors spring 30 is housed.

According to the invention, the axial retaining arrangement is further provided between outer ring 5 of rolling bearing 3 and scissors gear 4 so as to axially block the freely mounted auxiliary gear 26 between the axial retaining arrangement and main gear 23.

The axial retaining arrangement consists in the combination of an annular radial groove 31 provided to the outer ring 5 and a lock washer 32 mounted in the groove 31.

The annular radial groove 31 is disposed on the outer cylindrical surface 11 of outer ring 5, on the axial side of front surface 13, and is axially opposite to the main gear 23.

In the present embodiment, groove 31 consists in a rabbet and is open radially to the outer cylindrical surface 11 and axially to the front surface 13.

Groove 31 comprises a radial portion 33 extending in the rabbet, the radial portion 33 being formed by plastic deformation of the front surface 13.

The lock washer 32 is annular, and comprises a radial outer portion 34 and a substantially conical inner portion 35 with a plurality of tongues inwardly extending from the radial outer portion 34.

The substantially conical inner portion 35 of lock washer 32 is mounted in the annular groove 31 of outer ring 5. More precisely, the tongues are axially arranged between edges of groove 31. Advantageously, the tongues are first arranged in the rabbet 31 so as to contact the outer radial portion 34 against edge of the rabbet 31. Then the front surface 13 of outer ring 5 is plastically deformed until contact with free end of the tongues. An annular radial portion 33 is then formed in abutment against the tongues so as to prevent any displacement in one direction. Any clearance is then prevented between the inner conical portion 35 of lock washer and the edges of annular groove 31.

Alternatively, the groove 31 is pre-formed with two edges, and the tongues are elastically deformed by axial insertion into the groove. Advantageously, the edge of groove 31 on the axial side of insertion is provided with a sloped surface 36 so as to ease the insertion of lock washer 32.

Advantageously, the tongues with sharp lower edge can grip with the bottom of the annular groove 31 so as to prevent any axial displacement.

The lock washer 32 is then securely fixed with the outer ring 5.

The radial outer portion 34 of lock washer 32 radially extends beyond groove 31 so as to form an axial stop for the auxiliary gear 26. The freely mounted auxiliary gear 26 is then axially blocked in a first axial direction by the axial portion 34 of lock washer 32 that is securely fixed with the outer ring 5 of rolling bearing 3, and in a second axial direction by the main gear 23 that is press fitted onto the outer cylindrical surface 11 of the outer ring 5.

Representative, non-limiting examples of the present invention were described above in details with reference to the attached drawings. This details description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, various features of the above-described representative examples, may be combined in ways that are not specifically and explicitly enumerated in order to provide additional useful embodiments of the present teachings.

What is claimed is:

1. A bearing assembly comprising:
a rotating shaft;

a rolling bearing having an inner ring mounted on the rotating shaft, an outer massive ring, and at least one row of rolling elements radially housed between the inner ring and outer ring;

a scissors gear having a main gear press fitted onto an outer cylindrical surface of the outer massive ring, an auxiliary gear loosely mounted onto the outer cylindrical surface onto the outer cylindrical surface, and a scissors spring arranged between the main gear and the auxiliary gear; and an axial retaining arrangement provided between the outer massive ring of the rolling bearing and scissors gear, the auxiliary gear being axially blocked between the axial retaining arrangement and the main gear, wherein the axial retaining arrangement consists of:

an annular radial groove disposed at one axial end of the outer cylindrical surface and axially opposite to the main gear, and circumferentially radially open to the outer cylindrical surface, and an annular lock washer comprising a radial outer portion and a substantially conical inner portion with a plurality of tongues inwardly extending from the radial outer portion, the substantially conical inner portion being mounted in the annular groove, the radial outer portion radially extending beyond the groove so as to form an axial stop for the auxiliary gear.

2. The bearing assembly according to claim 1, wherein the rolling elements are balls.

3. The bearing assembly according to claim 2, wherein two axially adjacent rows of rolling elements are radially arranged between the inner ring and the outer ring of rolling bearing.

4. The bearing assembly according to claim 3, wherein the rolling elements are circumferentially maintained by a cage.

5. The bearing assembly according to claim 2, wherein the rolling elements are circumferentially maintained by a cage.

6. The bearing assembly according to claim 2, wherein the annular groove is a rabbet open axially on a front surface and radially on the outer cylindrical surface of the outer massive ring, and comprises a radial portion extending in the rabbet which is in abutment against an inner end of the substantially conical portion of lock washer, the radial portion being formed by plastic deformation of the front surface.

7. The bearing assembly according to claim 6, wherein the radial portion comprises an outer sloped surface so as to ease the insertion of the substantial conical inner portion of lock washer in the rabbet.

8. The bearing assembly according to claim 2, wherein the rotating shaft is a balancing shaft.

9. The bearing assembly according to claim 1, wherein two axially adjacent rows of rolling elements are radially arranged between the inner ring and the outer ring of rolling bearing.

10. The bearing assembly according to claim 9, wherein the rolling elements are circumferentially maintained by a cage.

11. The bearing assembly according to claim 9, wherein the annular groove is a rabbet open axially on a front surface and radially on the outer cylindrical surface of the outer massive ring, and comprises a radial portion extending in the rabbet which is in abutment against an inner end of the substantially conical portion of lock washer, the radial portion being formed by plastic deformation of the front surface.

12. The bearing assembly according to claim 11, wherein the radial portion comprises an outer sloped surface so as to ease the insertion of the substantial conical inner portion of lock washer in the rabbet.

13. The bearing assembly according to claim 12, wherein the rotating shaft is a balancing shaft.

14. The bearing assembly according to claim 9, wherein the rotating shaft is a balancing shaft.

15. The bearing assembly according to claim 1, wherein the rolling elements are circumferentially maintained by a cage.

16. The bearing assembly according to claim 15, wherein the rotating shaft is a balancing shaft.

17. The bearing assembly according to claim 1, wherein the annular groove is a rabbet open axially on a front surface and radially on the outer cylindrical surface of the outer massive ring, and comprises a radial portion extending in the rabbet which is in abutment against an inner end of the substantially conical portion of lock washer, the radial portion being formed by plastic deformation of the front surface.

18. The bearing assembly according to claim 17, wherein the radial portion comprises an outer sloped surface so as to ease the insertion of the substantial conical inner portion of lock washer in the rabbet.

19. The bearing assembly according to claim 1, wherein the rotating shaft is a balancing shaft.

* * * * *